US012578487B2

(12) United States Patent
Frach

(10) Patent No.: US 12,578,487 B2
(45) Date of Patent: Mar. 17, 2026

(54) PHOTON DETECTOR, DETECTOR DEVICE AND IMAGING APPARATUS

(71) Applicant: KONINKLIJKE PHILIPS N.V., Eindhoven (NL)

(72) Inventor: Thomas Frach, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 177 days.

(21) Appl. No.: 18/691,906

(22) PCT Filed: Sep. 15, 2022

(86) PCT No.: PCT/EP2022/075588
§ 371 (c)(1),
(2) Date: Mar. 14, 2024

(87) PCT Pub. No.: WO2023/046555
PCT Pub. Date: Mar. 30, 2023

(65) Prior Publication Data
US 2024/0385338 A1 Nov. 21, 2024

(30) Foreign Application Priority Data

Sep. 24, 2021 (EP) ..................................... 21198847

(51) Int. Cl.
| | |
|---|---|
| G01T 1/22 | (2006.01) |
| G01T 1/24 | (2006.01) |
| G01T 1/29 | (2006.01) |

(52) U.S. Cl.
CPC ............... *G01T 1/22* (2013.01); *G01T 1/241* (2013.01); *G01T 1/248* (2013.01); *G01T 1/249* (2013.01); *G01T 1/2985* (2013.01)

(58) Field of Classification Search
CPC ......... G01T 1/22; G01T 1/2985; G01T 1/147; G01T 1/148; G01T 1/149
See application file for complete search history.

(56) References Cited

U.S. PATENT DOCUMENTS

| | | |
|---|---|---|
| 9,087,755 B2 | 7/2015 | Frach |
| 10,656,288 B2 | 5/2020 | Frach et al. |

(Continued)

OTHER PUBLICATIONS

Estrada et al., "First Cerenkov charge-induction (CCI) TlBr detector for TOF-PET and proton range verification" Phy. Med. Biol. 64(2019)175001(6pp), pp. 1-6, Aug. 28, 2019.

(Continued)

*Primary Examiner* — Casey Bryant

(57) ABSTRACT

The present invention relates to a photon detector, a detector device and an imaging apparatus for detection of radiation, in particular gamma radiation. The photon detector comprises a direct conversion detector (11) configured to detect gamma radiation and generate direct conversion signals responsive to impingement of photons, a single photon avalanche diode. SPAD, detector array (12) comprising a plurality of SPAD detectors (13) configured to detect Cherenkov radiation generated in the direct conversion detector in response to impingement of photons and generate SPAD detection signals, and an electrode array (14) comprising aurality of electrodes arranged on top of the direct conversion detector and between the direct conversion detector and the SPAD detector array and configured to read out the direct conversion signals. The SPAD detector array substantially covers a surface on one side of the direct conversion detector.

15 Claims, 5 Drawing Sheets

(56) References Cited

U.S. PATENT DOCUMENTS

| 2014/0175294 A1* | 6/2014 | Frach | H04N 25/70 |
|---|---|---|---|
| | | | 250/208.2 |
| 2018/0252825 A1* | 9/2018 | Benlloch Baviera | G01T 1/208 |
| 2021/0236073 A1* | 8/2021 | Kawata | A61B 6/5282 |
| 2022/0196856 A1* | 6/2022 | Kawata | G01T 1/2018 |
| 2024/0113147 A1* | 4/2024 | Pratte | H10F 77/933 |

OTHER PUBLICATIONS

Estrada et al., "Energy and electron drift time measurements in a pixel CCI TIBr detector with 1.3 MeV prompt-gammas" Physics in Medicine & Biology, vol. 66 No. 4, Feb. 1, 2021, pp. 1-9.
Talu et al., "Film Thickness Effect on Fractality of Tin-Doped In2O3 Thin Films", Electron. Mater. Lett., vol. 11, No. 5 (2015), pp. 749-757.
Tao et al., "Ionizing photon interactions modulate the optical properties of crystals with femtosecond scale temporal resolution", 2021 Phys. Med. Biol. 66 045032.
International Search report and Written Opinion of PCT/EP2022/075588, dated Sep. 15, 2022.

* cited by examiner

PHOTON DETECTOR, DETECTOR DEVICE AND IMAGING APPARATUS

CROSS-REFERENCE TO PRIOR APPLICATIONS

This application is the U.S. National Phase application under 35 U.S.C. § 371 of International Application No. PCT/EP2022/075588, filed on Sep. 15, 2022, which claims the benefit of European Patent Application No. 21198847.2, filed on Sep. 24, 2021. These applications are hereby incorporated by reference herein.

FIELD OF THE INVENTION

The present invention relates to a photon detector, a detector device and an imaging apparatus for detection of radiation, in particular gamma radiation. It particularly relates to high-speed and high spatial and time resolution radiation detection for applications in physics, astronomy, radiological imaging such as positron emission tomography (PET) or single-photon emission tomography (SPECT), and so forth

BACKGROUND OF THE INVENTION

Photon counting has conventionally been implemented using photomultiplier tube (PMT) detectors, which comprise a light-sensitive photocathode and a set of "multiplier" anode terminals. The photocathode emits at least one electron responsive to impingement of a photon, and the electron(s) in turn strike successive anode terminals with each such event causing emission of a cascade of electrons, thus producing a multiplication effect that results in a measurable electrical pulse. A PMT is capable of high speed photon counting. PMT detectors have disadvantages including being relatively bulky discrete devices with large optical windows that operate at high voltage and are susceptible to failure due to the evacuated tube design and the high operational electrical voltage.

Silicon photomultiplier (SiPM) devices have been developed to overcome some of these disadvantages, and to provide photon-counting detectors that are readily integrated with silicon-based signal/data processing circuitry. In some embodiments, a SiPM device employs an avalanche photodiode as the light sensor. When biased above its breakdown voltage, the avalanche diode goes into break down responsive to impingement of a single photon. Such a device is sometimes called a single photon avalanche diode (SPAD) detector. In a typical SPAD detector, the avalanche photodiode is reverse biased above its break down voltage and is in series with a quenching resistor. Impingement of a single photon causes the p-n junction to break down in a multiplicative (i.e., "avalanche") cascade of electrons that flow in the SPAD detector as a measurable electrical current. This current is quenched relatively quickly as voltage over the resistor due to the current flow lowers the reverse bias across the avalanche diode to a level below its break down voltage. Additionally or alternatively, an active quenching sub-circuit comprising (for example) one or more diodes, resistors, and/or transistors can provide more rapid quenching.

Digital silicon photomultipliers are used as photon detectors in high-performance PET/CT systems. Coupled to a time-of-flight capable scintillator, the fast trigger logic of the digital silicon photomultiplier enables time resolution in the range of 100 ps-200 ps. Time resolution of these systems is limited, among others, by the time spread of the scintillation process. New detector concepts using prompt photons have been proposed, potentially offering improvement of time resolution significantly below 100 ps.

Another approach disclosed in Ariño-Estrada, Roncali, Selfridge, Du, Glodo, Shah, Cherry (2020), "Prompt Luminescence in High-Efficiency Thallium Chloride Crystals for TOF-PET", IEEE NSS-MIC 2020 uses transparent semiconducting crystals of TlBr or TlCl to combine the time stamp generation through Cherenkov photons with charge readout for the gamma energy measurement. In the proposed detector, an analog silicon photomultiplier (SiPM) attached to a side of the crystal is used to detect a small number of Cherenkov photons and use this information to generate a time stamp with picosecond precision. Additionally, an array of electrodes is applied along the crystal to serve a charge readout used to determine the position of interaction and energy of the event.

Another approach is disclosed in Li Tao et al, "Ionizing photon interactions modulate the optical properties of crystals with femtosecond scale temporal resolution", 2021 Phys. Med. Biol. 66 045032. The main problem of the disclosed approach is the low number of Cherenkov photons generated and subsequently detected by the SiPM. Though there can be up to 10-20 photons generated, only very few are actually detected. This is partially because of the absorption in the crystal, and low photon detection efficiency (PDE) of the SiPM. Additionally, many reflections occur along the crystal leading to a position-dependent time spread of the photons that has to be corrected.

U.S. Pat. No. 10,656,288 B2 discloses a radiation detector that includes an array of detector pixels each including an array of detector cells. Each detector cell includes a photodiode biased in a breakdown region and digital circuitry coupled with the photodiode and configured to output a first digital value in a quiescent state and a second digital value responsive to photon detection by the photodiode. Digital triggering circuitry is configured to output a trigger signal indicative of a start of an integration time period responsive to a selected number of one or more of the detector cells transitioning from the first digital value to the second digital value. Readout digital circuitry accumulates a count of a number of transitions of detector cells of the array of detector cells from the first digital state to the second digital state over the integration time period.

SUMMARY OF THE INVENTION

It is an object of the present invention to provide a photon detector having an improved time resolution and detection sensitivity. It is a further object of the present invention to provide a corresponding detector device and imaging apparatus.

In a first aspect of the present invention a photon detector is presented comprising a direct conversion detector configured to detect gamma radiation and generate direct conversion signals responsive to impingement of photons, a single photon avalanche diode, SPAD, detector array comprising a plurality of SPAD detectors configured to detect Cherenkov radiation generated in the direct conversion detector in response to impingement of photons and generate SPAD detection signals, and an electrode array comprising a plurality of electrodes arranged on top of the direct conversion detector and between the direct conversion detector and the SPAD detector array and configured to read out the direct conversion signals, wherein the SPAD detector array substantially covers a surface on one side of the direct conversion detector.

In a further aspect of the present invention a detector device comprising a plurality of photon detectors as disclosed herein is presented.

In a further aspect of the present invention an imaging apparatus comprising a detector device as disclosed herein is presented.

Preferred embodiments of the invention are defined in the dependent claims. It shall be understood that the claimed detector device and the claimed imaging apparatus has similar and/or identical preferred embodiments as the claimed photon detector, in particular as defined in the dependent claims and as disclosed herein.

The present invention is based on the idea to combine the charge readout circuit (comprising the direct conversion detector and the electrode array) with a digital high sensitivity SiPM (comprising the SPAD detector array) and place the optical sensor of the digital SiPM e.g. beneath the charge readout electrodes. The integration of the charge readout with the digital SiPM simplifies system design and integration and reduces the cost of the detection unit. Ideally, the detector crystal may be bonded directly to the readout chip.

According to the present invention the SPAD detector array is preferably optimized for the expected Cherenkov emission spectra and time distribution and may use fast validation logic to suppress dark noise. The gamma radiation is losing energy to electrons, which can emit (very few) Cherenkov photons. These Cherenkov photons can leave the direct conversion crystal and be detected by the SPAD detector array. Additionally, the charge readout signal may be used to further filter the triggers for gamma events. The sensor chip may be bonded to the charge sensing electrodes on the long side of the direct-converter material block to maximize the solid angle and therefore light extraction, and the remaining sensor surface may be in contact with the crystal and optimized for the Cherenkov emission spectrum. By covering substantially more area of the crystal of the direct conversion detector, more of the Cherenkov photons are detected and the time stamp is defined better compared to the readout in known photon detectors. Further, a correction for a depth-of-interaction effect is not needed or is at least simplified.

The claimed photon detector can be implemented in different ways. In an exemplary implementation the photon detector comprises two SPAD detector arrays including a first SPAD detector array arranged on a first side of the direct conversion detector facing the impinging photons and a second SPAD detector array arranged on a second side of the direct conversion detector opposite the first side and facing away from the impinging photons, and two electrode arrays comprising a first electrode array arranged between the first SPAD detector array and the direct conversion detector and a second electrode array arranged between the second SPAD detector array and the direct conversion detector.

In other implementations a signal SPAD detector array and a single electrode array are provided.

The electrodes of the electrode array may be made of a material that is substantially transparent for radiation in a wavelength range of Cherenkov photons, in particular between 300 and 600 nm. Cherenkov photons follow an inverse exponential distribution function. The lower limit of the wavelength range in which Cherenkov photos are emitted (and for which the electrodes should be transparent) is generally given by the absorption of short-wavelength photons in the direct conversion crystal, coupling to the sensor and its sensitivity.

Preferably, the electrodes of the electrode array are made of a material that has a transmission rate of more than 60%, in particular more than 75%, for radiation in a wavelength range of Cherenkov photons.

Different materials may be used of manufacturing the electrodes of the electrode array. Preferably, they may be made of one of carbon nanotubes, graphene, graphene-covered hybrid materials, doped compounds, conductive polymers, amorphous indium zinc oxide, silver nanoparticle indium tin oxide (ITO), indium tin oxide or an alloy comprising indium, aluminum, gallium and zinc oxide, carbon nanotubes, graphene or graphene-covered hybrid materials. For instance, ITO is transparent well below 400 nm and therefore allows many of the Cherenkov photons to exit the crystal directly to be detected. Charge sensing electrodes made of ITO may be deposited onto the direct converter in a thin layer in order to maintain transparency for Cherenkov photons. Charge readout may be implemented in ways to allow re-polarization of the direct converter crystal.

In an embodiment the SPAD detectors are configured to be sensitive in a wavelength range below 600 nm, in particular in a range of 300 to 600 nm. In this range most Cherenkov photos are emitted.

In another embodiment the SPAD detectors are configured as p-on-n SPAD detectors. Such a p-on-n design is a diode design with the anode being the top layer. It improves sensitivity for short-wavelength photons. One such design in described in U.S. Pat. No. 9,087,755 B2.

According to another embodiment the SPAD detectors comprise an anti-reflective coating. Antireflective coating is a system of layers, typically made of silicon nitride/oxide (but can use other materials), to minimize transmission losses for photons crossing an interface between two materials with different index of refraction. Normally, this is air (n=1) and glass (n~1.4). Here it would be the direct conversion crystal (or electrode), glue, and silicon. The coating is typically deposited on top of the sensor. It may be realized using the oxide/nitride layers that are used in the chip back-end.

Preferably, the SPAD detector array is bonded to the electrode array.

In an implementation the detector device, which comprises a plurality of photon detectors according to the present invention, further comprises processing circuitry configured to combine the direct conversion signals and the SPAD detection signals into combined signals, wherein the direct conversion signals provide information on spatial distribution and energy distribution of photon impingement and the SPAD detection signals provide information on spatial distribution and time distribution of photon impingement, the combined signals comprising combined information on spatial distribution, energy distribution and time distribution of photon impingement. The processing circuitry may hereby be configured to use the SPAD detection signals for estimating the position of photon impingement on the direct conversion detector. In this way additional information can be gained from the detected radiation and the generated signals.

In another implementation the detector device comprises charge detection circuitry coupled to the electrodes of the electrode array configured to process the direct conversion signals. The charge detection circuitry may comprise, per electrode or group of electrodes, a charge-sensitive amplifier, a shaping circuit and an analog-to-digital converter.

The disclosed detector device may further comprise time-to-digital circuitry (TDC) coupled to the SPAD detector array and configured to generate a digital time stamp for detection events of the detection of Cherenkov radiation. Using e.g. multiple TDCs and position of interaction estimation based on the charge readout, makes it possible to further improve the time stamp estimation and the desired time resolution.

The claimed imaging apparatus that comprises a detector device as disclosed herein may e.g. be a PET apparatus, a CT apparatus, a SPECT apparatus, a Time-of-Flight (TOF) PET apparatus, or a Compton camera.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Figure 1:
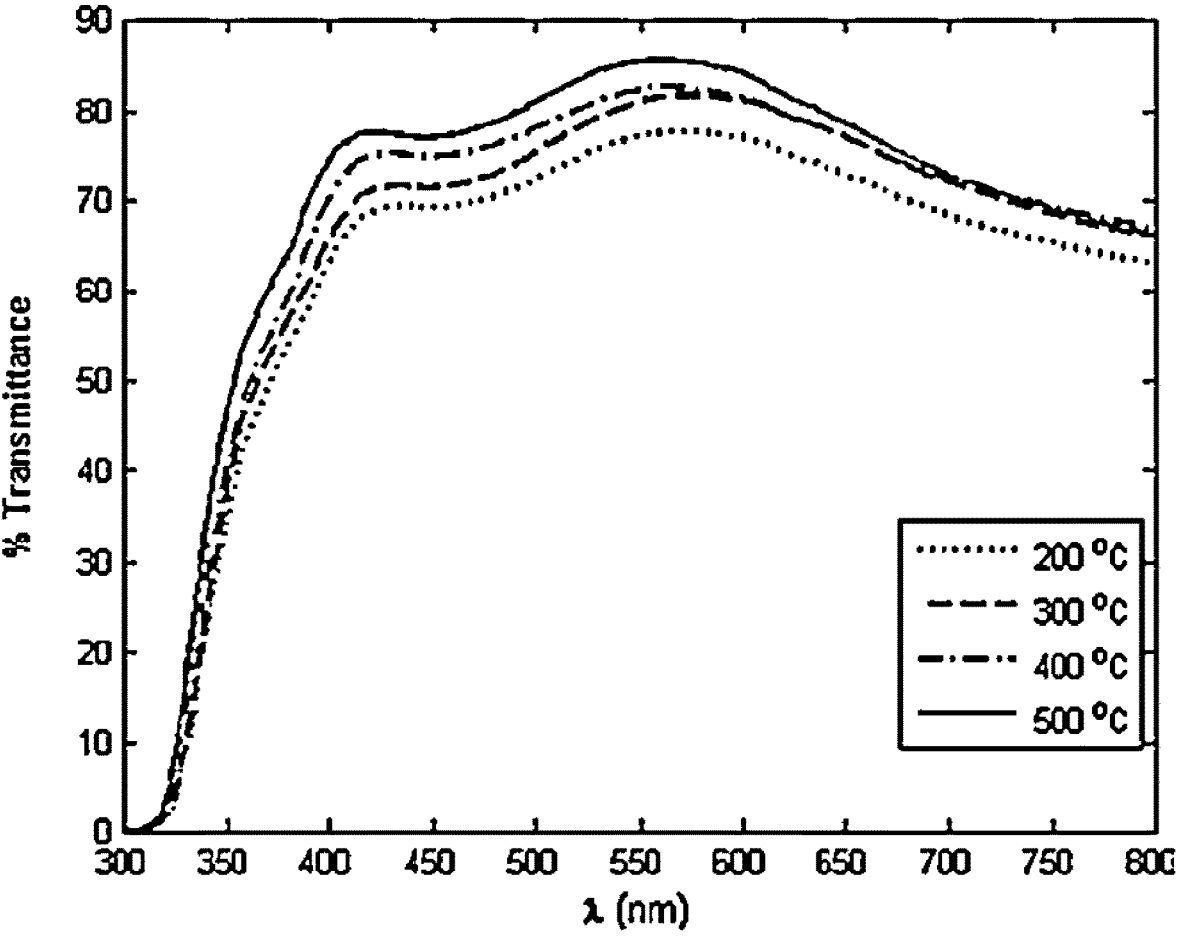
FIG. 1 shows a diagram of a transmission spectrum of a thin ITO film at different temperatures.
Figure 2:
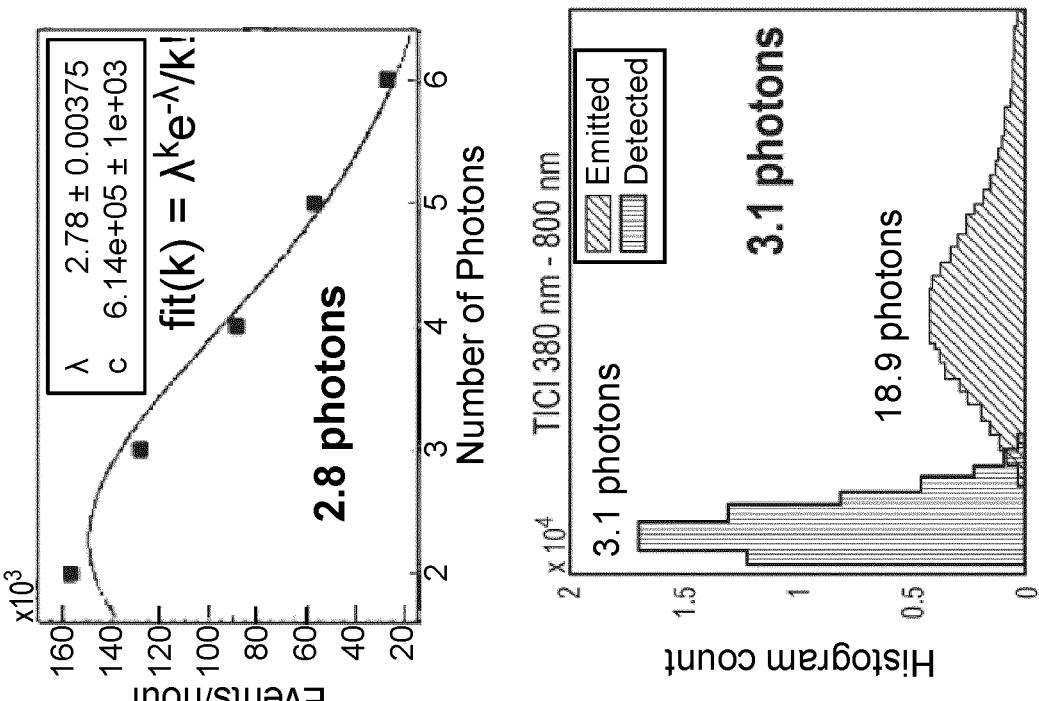
FIG. 2 shows diagrams illustrating the number of generated Cherenkov photons.
Figure 2:
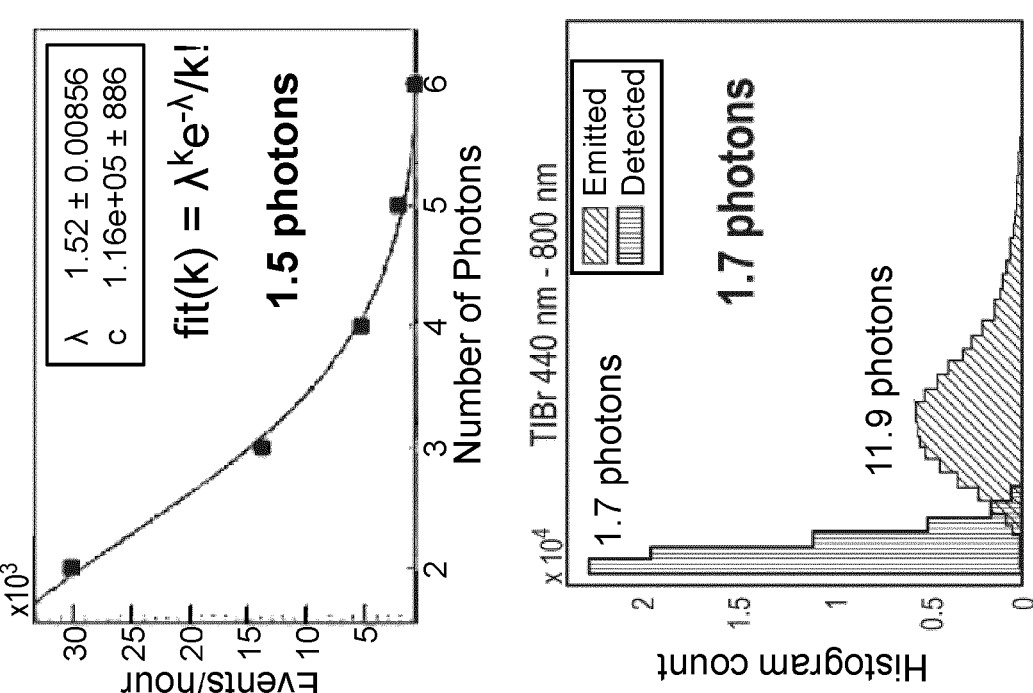

A transparent, semiconducting detector crystal for use in a photon detector may be prepared using thin film deposition of ITO (other materials may be used in other embodiments) with subsequent patterning and preparation of contact pads. The ITO electrodes are optimized to have minimum losses in the emission spectrum of the Cherenkov radiation that is passing through the pads to each of the SPADs of a digital SiPM located beneath the pads. An example of a transmission spectrum (taken from the disclosure of Li Tao et al. cited above) of a thin ITO film is shown in FIG. 1. Data (taken from the disclosure of Ariño-Estrada et al. cited above) on the number of generated Cherenkov photons are shown in the diagrams depicted in FIG. 2.

Figure 3:
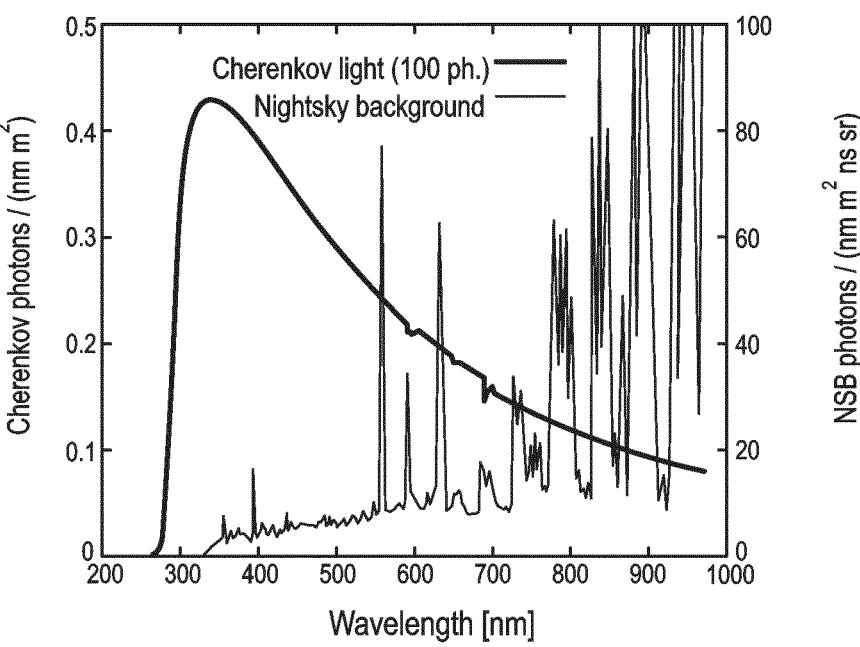
FIG. 3 shows a diagram of a typical spectrum of Cherenkov emission in the atmosphere.

FIG. 3 shows a diagram of a typical spectrum of Cherenkov emission in the atmosphere (taken from Mehrez, Fatima. (2015). Design and test of a readout ASIC for a SiPM-based camera: ALPS (ASIC de lecture pour un photodétecteur SiPM)). Inside a scintillator, the absorption properties of the crystal need to be taken into account and can significantly modify the spectrum.

Figure 4:
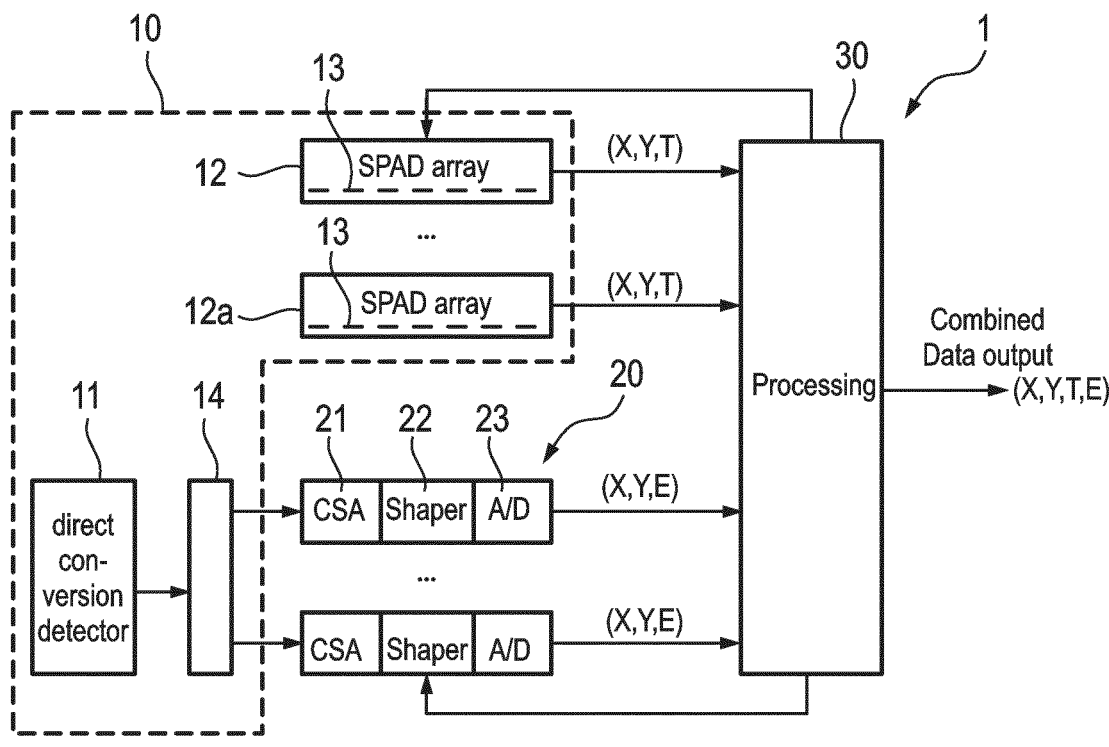
FIG. 4 shows a schematic diagram of an embodiment of a detector device including a photon detector according to the present invention.

FIG. 4 shows a schematic diagram of an embodiment of a detector device 1 according to the present invention including a photon detector 10 according to the present invention. A cross-sectional view of a first embodiment of the photon detector 10 deploying double-sided readout is shown in FIG. 5.

Figure 5:
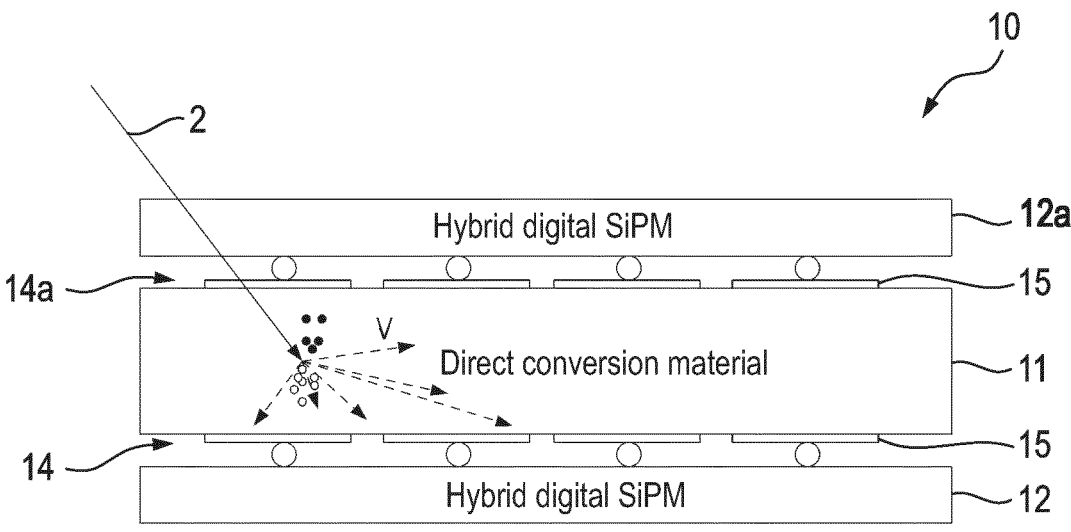
FIG. 5 shows cross sectional view of a first embodiment of the photon detector according to the present invention deploying double-sided readout.

The photon detector 10 comprises a direct conversion detector 11, one or more SPAD detector arrays 12 (in this embodiment two SPAD detector arrays 12, 12a) each comprising a plurality of SPAD detectors 13 and one or more electrode arrays 14 (in the embodiment shown in FIG. 5 two electrode arrays 14, 14a). The direct conversion detector 11 is configured to detect gamma radiation 2 and generate direct conversion signals responsive to impingement of photons. The SPAD detectors 13 are configured to detect Cherenkov radiation generated in the direct conversion detector 11 in response to impingement of photons and generate SPAD detection signals. The one or more electrode arrays 14 each comprises a plurality of electrodes 15 arranged on top of the direct conversion detector 11 and between the direct conversion detector 11 and the respective SPAD detector array 12 and configured to read out the direct conversion signals. A SPAD detector array 12 substantially covers at least one surface on one side of the direct conversion detector 11, meaning that it is arranged adjacent to at least the biggest part (at least 75% or even at least 90%) of said surface or the complete surface. In the embodiment shown in FIG. 5 the two SPAD detector arrays 12, 12a are arranged on opposite surfaces of the direct conversion detector 11, with a respective electrode array 14, 14a bonded to the direct conversion detector 11 in between.

Generally, one or more SPAD detector arrays 12 may be provided in the photon detector. Each SPAD detector array 12 may be realized as a micro-size digital Silicon Photo-multiplier (dSiPM).

In the embodiment of the detector device 1 shown in FIG. 4, charge detection circuitry 20 is coupled to the electrodes of the electrode array(s) 14 that is configured to process the direct conversion signals. The charge detection circuitry comprises, per electrode or group of electrodes, analog charge-sensitive amplifiers (CSA) 21 with additional signal conditioning, shapers 22 for shaping and analog-to-digital (ADC) converters 23 for digitization. The charge detection circuitry 20 may be implemented in the proximity of the I/O pads of the chip area. As this analog part of the chip is very sensitive to switching noise, it may be implemented in a specially isolated part of the chip using triple-well and deep trench isolation.

The CSA inputs are connected to the sensing electrodes 15 deposited on the semiconductor crystal while the sensitive area of the dSiPM is in optical contact with the crystal surface. TSV-based CSP packaging of the sensor chip may be used to ensure a four-side buttable design.

The signal acquisition is started upon the detection of multiple photons within a short time window, using a validated trigger of the digital SiPM, which in turn starts the charge readout and digitization. The result of the charge readout can be used as second level validation.

As the number of potentially detectable photons is very low, the SPAD detector arrays 12 can be used to measure the position of the detected photons by decoding the position of the activated SPAD. This additional information can be used to estimate the position of interaction within the crystal (of the direct conversion detector) and to correct for propagation times of the photons. The information can be complemented by the charge readout data to improve the positioning accuracy.

The narrow time coherence of the Cherenkov photons further enables efficient filtering of the dark count noise, which is the dominating factor in this type of photon detector and will limit the total detection area of this type of detector. Additionally, the effect of the dark noise can be mitigated by reducing the number of SPAD detectors in the SPAD detector array (e.g. comprising 4×4 or 8×8 SPAD detectors). Each SPAD detector array may be configured as dSiPM providing a trigger signal to independent TDC for time stamping. Reducing the number of SPAD detectors in the SPAD detector array and increasing the number of TDCs per chip will reduce the effect of dead time of the slow time stamp conversion.

Additionally, the resulting time-stamped events may be stored in buffer memory and may be filtered using a validation signal derived from the charge measurement and a user-defined energy window.

Processing circuitry 30, e.g. in the form of a processor, is provided to combine the direct conversion signals and the SPAD detection signals into combined signals. The direct conversion signals provide information on spatial distribution and energy distribution of photon impingement and the SPAD detection signals provide information on spatial distribution and time distribution of photon impingement. The combined signals comprise combined information on spatial distribution, energy distribution and time distribution of photon impingement. The processing circuitry 30 may further be configured to use the SPAD detection signals for estimating the position of photon impingement on the direct conversion detector.

In other words, according to the present invention the SPAD detector array provides the photon position (X, Y) and time stamp (T). The analog part (the charge detection circuitry 20) provides the charge distribution corresponding to the energy (E) of the event. According to the present invention, an improved implementation of the digital SiPM to be used in charge induction radiation detectors is provided.

The processing circuitry 30 may, in an embodiment, further comprise time-to-digital circuitry coupled to the SPAD detector array and configured to generate a digital time stamp for detection events of the detection of Cherenkov radiation. In another embodiment, separate circuitry, e.g. in the form of a processor, may be provided to realize the time-to-digital circuitry.

Figure 6:
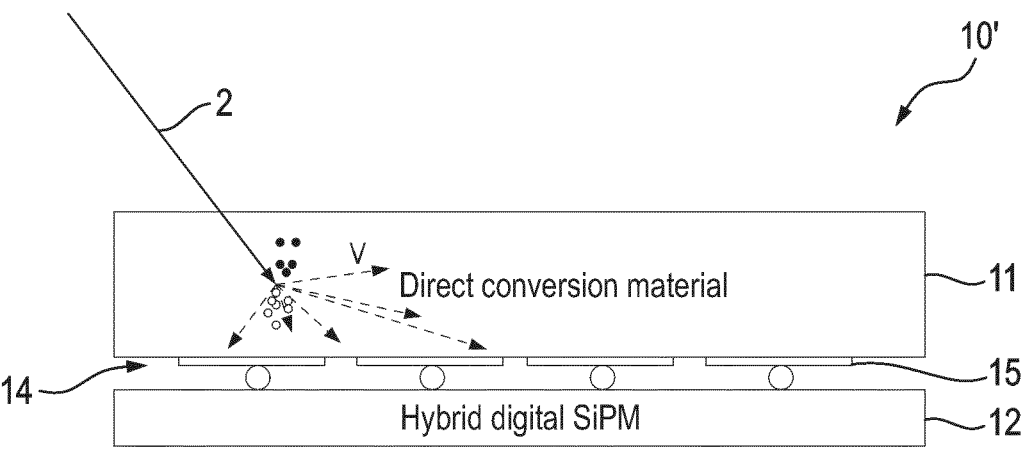
FIG. 6 shows a cross sectional view of a second embodiment of the photon detector according to the present invention deploying one-sided readout.

FIG. 6 shows a cross sectional view of a second embodiment of the photon detector 110 according to the present invention deploying one-sided readout. Different from the photon detector 10 a single SPAD detector array 12 and a single electrode array 14 are provided on a single side of the direct conversion detector 11 (in this embodiment beneath the direct conversion detector 11).

Figure 7:
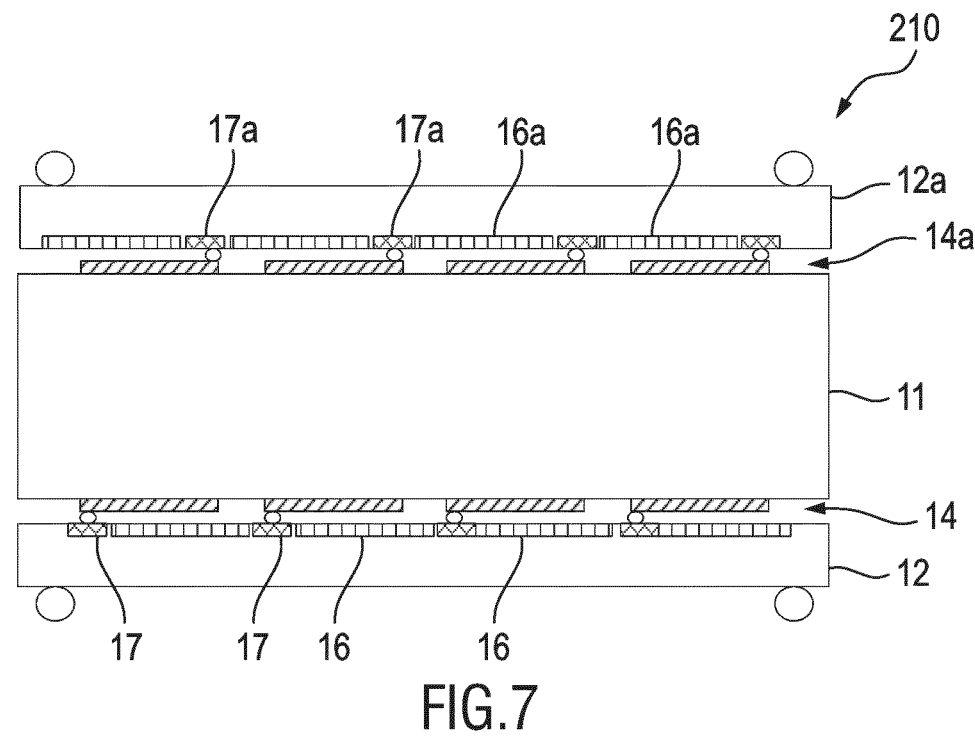
FIG. 7 shows cross sectional view of a third embodiment of the photon detector according to the present invention deploying double-sided readout.

FIG. 7 shows a cross sectional view of a third embodiment of the photon detector 210 according to the present invention deploying double-sided readout. In this embodiment the SPAD detector arrays 12, 12a comprise, on the respective surface side facing the direct conversion detector 11, the sensitive area 16, 16a of the digital SiPM (the small rectangles are the SPAD microcells) and bond pads 17, 17a.

Figure 8:
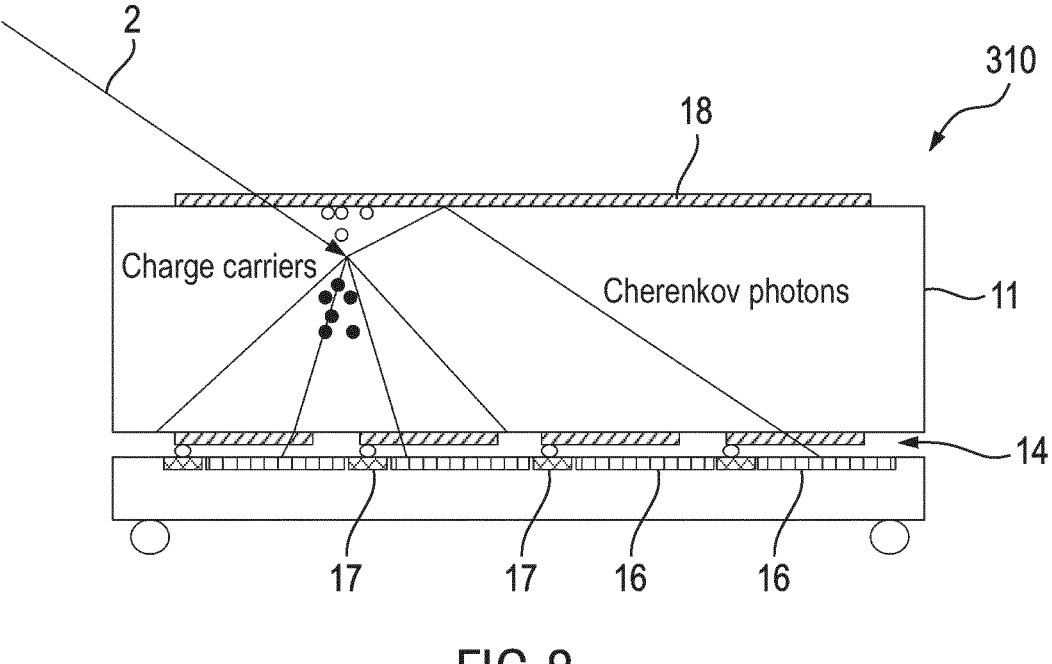
FIG. 8 shows a cross sectional view of a fourth embodiment of the photon detector according to the present invention deploying one-sided readout.

FIG. 8 shows a cross sectional view of a fourth embodiment of the photon detector 310 according to the present invention deploying one-sided readout. In this embodiment the SPAD detector array 12 comprise, on the surface side facing the direct conversion detector 11, the sensitive area 16 and bond pad 17. Further, on the surface side of the direct conversion detector 11 facing away from the SPAD detector array 12 an electrode 18 is provided.

In the double-sided readout case shown in FIG. 7, the contact 17 supplies the bias voltage on one side, similar to the single electrode 18 in the single-sided readout case shown in FIG. 8. In an embodiment all other sides of the crystal (not in contact with sensors) may be covered with a reflector.

The electrodes 15 of the electrode array(s) are preferably made of a material that is substantially transparent for radiation in a wavelength range of Cherenkov photons, in particular between 300 and 600 nm. Preferably, the electrodes 15 of the electrode array(s) are made of a material that has a transmission rate of more than 60%, in particular more than 75%, for radiation in a wavelength range of Cherenkov photons to ensure that the Cherenkov photons can pass through the electrodes to the SPAD detectors. In implementations, the electrodes 15 of the electrode array(s) may be made of one of carbon nanotubes, graphene, graphene-covered hybrid materials, doped compounds, conductive polymers, amorphous indium zinc oxide, silver nanoparticle indium tin oxide, indium tin oxide or an alloy comprising indium, aluminum, gallium and zinc oxide, carbon nanotubes, graphene or graphene-covered hybrid materials.

Cherenkov emission has, as e.g. shown in FIG. 3, a distinct spectrum with a maximum in the blue near-ultraviolet (NUV) range. The SiPM shall thus be optimized to be sensitive in the short-wavelength range. This may be achieved by p-on-n SPAD design coupled with very thin anode and dedicated anti-reflective coating with peak transmission in the NUV. The SPAD detectors are thus preferably configured to be sensitive in a wavelength range below 600 nm, in particular in a range of 300 to 600 nm, and may be configured as p-on-n SPAD detectors and/or may comprise an anti-reflective coating.

The electrode (in particular ITO electrodes) may be optimized to have minimum "optical" losses as the photons need to cross the ITO in order to enter the SiPM (assuming the ITO electrodes are not structured). The ITO may thus become part of the anti-reflective structure on top of the SPAD arrays and should be taken into account in the optimization (thickness, composition of the other layers . . . ).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. Photon detector comprising:

a direct conversion detector configured to detect gamma radiation and generate direct conversion signals responsive to impingement of photons, a single photon avalanche diode, SPAD, detector array comprising a plurality of SPAD detectors configured to detect Cherenkov radiation generated in the direct conversion detector in response to impingement of photons and generate SPAD detection signals, and an electrode array comprising a plurality of electrodes arranged on top of the direct conversion detector and between the direct conversion detector and the SPAD detector array and configured to read out the direct conversion signals, wherein the SPAD detector array substantially covers a surface on one side of the direct conversion detector.

2. Photon detector as claimed in claim 1, comprising two SPAD detector arrays including a first SPAD detector array arranged on a first side of the direct conversion detector facing the impinging photons and a second SPAD detector array arranged on a second side of the direct conversion detector opposite the first side and facing away from the impinging photons, and two electrode arrays comprising a first electrode array arranged between the first SPAD detector array and the direct conversion detector and a second electrode array arranged between the second SPAD detector array and the direct conversion detector.

3. Photon detector as claimed in claim 1, wherein the electrodes of the electrode array are made of a material that is substantially transparent for radiation in a wavelength range of Cherenkov photons, in particular between 300 and 600 nm.

4. Photon detector as claimed in claim 1, wherein the electrodes of the electrode array are made of a material that has a transmission rate of more than 60%, in particular more than 75%, for radiation in a wavelength range of Cherenkov photons.

5. Photon detector as claimed in claim 1, wherein the electrodes of the electrode array are made of one of carbon nanotubes, graphene, graphene-covered hybrid materials, doped compounds, conductive polymers, amorphous indium zinc oxide, silver nanoparticle indium tin oxide, indium tin oxide or an alloy comprising indium, aluminum, gallium and zinc oxide, carbon nanotubes, graphene or graphene-covered hybrid materials.

6. Photon detector as claimed in claim 1, wherein the SPAD detectors are configured to be sensitive in a wavelength range below 600 nm, in particular in a range of 300 to 600 nm.

7. Photon detector as claimed in claim 1, wherein the SPAD detectors are configured as p-on-n SPAD detectors.

8. Photon detector as claimed in claim 1, wherein the SPAD detectors comprise an anti-reflective coating.

9. Photon detector as claimed in claim 1, wherein the SPAD detector array is bonded to the electrode array.

10. Detector device comprising a plurality of photon detectors according to claim 1.

11. Detector device as claimed in claim 10, comprising processing circuitry configured to combine the direct conversion signals and the SPAD detection signals into combined signals, wherein the direct conversion signals provide information on spatial distribution and energy distribution of photon impingement and the SPAD detection signals provide information on spatial distribution and time distribution of photon impingement, the combined signals comprising combined information on spatial distribution, energy distribution and time distribution of photon impingement.

12. Detector device as claimed in claim 11, wherein the processing circuitry is configured to use the SPAD detection signals for estimating the position of photon impingement on the direct conversion detector.

13. Detector device as claimed in claim 10, comprising charge detection circuitry coupled to the electrodes of the electrode array configured to process the direct conversion signals, in particular comprising, per electrode or group of electrodes, a charge-sensitive amplifier, a shaping circuit and an analog-to-digital converter.

14. Detector device as claimed in claim 1, further comprising time-to-digital circuitry coupled to the SPAD detector array and configured to generate a digital time stamp for detection events of the detection of Cherenkov radiation.

15. Imaging apparatus comprising a detector device as claimed in claim 10.

* * * * *